(12) United States Patent
Partee (10) Patent No.: US 9,792,104 B2
(45) Date of Patent: Oct. 17, 2017

(54) SYSTEM AND METHOD FOR FLASHING A WIRELESS DEVICE

(75) Inventor: Jimmie Paul Partee, Double Oak, TX (US)

(73) Assignee: FedEx Supply Chain Logistics & Electronics, Inc., Fort Worth, TX (US)

(*) Notice: Subject to any disclaimer, the term of this patent is extended or adjusted under 35 U.S.C. 154(b) by 630 days.

(21) Appl. No.: 12/940,411

(22) Filed: Nov. 5, 2010

(65) Prior Publication Data

US 2012/0117477 A1 May 10, 2012

(51) Int. Cl.
G06F 15/177 (2006.01)
G06F 3/048 (2013.01)
G06F 9/445 (2006.01)

(52) U.S. Cl.
CPC .................... *G06F 8/65* (2013.01)

(58) Field of Classification Search
CPC ............... G06F 15/177; G06F 3/048
USPC ......................................... 715/735
See application file for complete search history.

(56) References Cited

U.S. PATENT DOCUMENTS

| | | | |
|---|---|---|---|
| 5,666,493 A | 9/1997 | Wojcik | |
| 5,909,540 A | 6/1999 | Carter et al. | |
| 5,974,312 A * | 10/1999 | Hayes et al. | 455/419 |
| 6,236,593 B1 | 5/2001 | Hong et al. | |
| 6,342,903 B1 * | 1/2002 | Fado | G06F 3/16 704/270 |
| 6,539,476 B1 | 3/2003 | Marianetti et al. | |
| 6,611,780 B2 | 8/2003 | Lundell et al. | |
| 6,822,422 B2 | 11/2004 | Sagawa | |
| 7,076,449 B2 | 7/2006 | Tsunenari et al. | |
| 7,110,751 B1 * | 9/2006 | Overby | 455/418 |
| 7,337,310 B2 | 2/2008 | Cheston et al. | |
| 7,363,567 B2 | 4/2008 | Rands | |
| 7,552,482 B2 | 6/2009 | Redlich et al. | |

(Continued)

FOREIGN PATENT DOCUMENTS

| | | |
|---|---|---|
| EP | 1793573 | 6/2007 |
| EP | 1705872 | 12/2008 |
| WO | 2007035918 | 3/2007 |

OTHER PUBLICATIONS

Webster's II new Riverside university dictionary, 1984, p. 633, Houghton Mifflin Company.*

(Continued)

*Primary Examiner* — Tadeese Hailu
*Assistant Examiner* — Darrin Hope
(74) *Attorney, Agent, or Firm* — McGuireWoods LLP (57) ABSTRACT

A system and method for flashing wireless devices. One or more wireless devices are received. The testing device being operable to receive the one or more wireless devices simultaneously. A selection of one or more original equipment manufactures (OEMs) is received. Models of wireless devices associated with the one or more OEMS are visually displayed in response to receiving the selection of the one or more OEMS associated with the one or more wireless devices. A selection of one or more models associated with the one or more wireless devices is received on the test device. Instructions associated with the one or more models are displayed for flashing the one or more wireless devices. The one or more wireless devices are flashed in response to a user selection to flash each of the one or more wireless devices.

22 Claims, 5 Drawing Sheets

(56) References Cited

U.S. PATENT DOCUMENTS

| | | | |
|---|---|---|---|
| 8,429,409 B1 | 4/2013 | Wall et al. | |
| 8,788,432 B2 | 7/2014 | Junger | |
| 2002/0010784 A1 | 1/2002 | Clayton et al. | |
| 2002/0019777 A1 | 2/2002 | Schwab et al. | |
| 2002/0038265 A1 | 3/2002 | Mertz et al. | |
| 2002/0040325 A1 | 4/2002 | Takae et al. | |
| 2003/0004734 A1 | 1/2003 | Adler et al. | |
| 2003/0009465 A1 | 1/2003 | Brown et al. | |
| 2003/0103451 A1 | 6/2003 | Lutgen et al. | |
| 2003/0182504 A1 | 9/2003 | Nielsen et al. | |
| 2003/0233366 A1 | 12/2003 | Kesselman et al. | |
| 2004/0123281 A1 | 6/2004 | Olrik et al. | |
| 2004/0154014 A1 | 8/2004 | Bunger | |
| 2004/0172284 A1 | 9/2004 | Sullivan et al. | |
| 2004/0193610 A1 | 9/2004 | Alex et al. | |
| 2004/0230558 A1 | 11/2004 | Tokunaka | |
| 2005/0044015 A1 | 2/2005 | Bracken et al. | |
| 2005/0071032 A1 | 3/2005 | Urabe | |
| 2005/0266885 A1 | 5/2005 | Katayanagi | |
| 2006/0009214 A1 | 1/2006 | Cardina et al. | |
| 2006/0025177 A1 | 2/2006 | Tu | |
| 2006/0031673 A1 | 2/2006 | Beck et al. | |
| 2006/0075128 A1 | 4/2006 | Kotler et al. | |
| 2006/0293081 A1 | 12/2006 | Overby | |
| 2007/0015505 A1 | 1/2007 | Barrow et al. | |
| 2007/0027699 A1 | 2/2007 | Golding et al. | |
| 2007/0082705 A1 | 4/2007 | Jain et al. | |
| 2007/0156439 A1 | 7/2007 | Fyda et al. | |
| 2007/0173959 A1 | 7/2007 | Chandhoke | |
| 2007/0174518 A1 | 7/2007 | Chandhoke | |
| 2008/0005494 A1* | 1/2008 | Zimmer et al. | 711/152 |
| 2008/0013705 A1 | 1/2008 | Yoffie et al. | |
| 2008/0027581 A1 | 1/2008 | Saether et al. | |
| 2008/0059970 A1 | 3/2008 | Gonen | |
| 2008/0160983 A1 | 7/2008 | Poplett et al. | |
| 2008/0201277 A1 | 8/2008 | Ozdemir et al. | |
| 2008/0281691 A1 | 11/2008 | Pearson et al. | |
| 2008/0296374 A1 | 12/2008 | Gonen et al. | |
| 2009/0014363 A1 | 1/2009 | Gonen et al. | |
| 2009/0049207 A1 | 2/2009 | Reynolds et al. | |
| 2009/0075630 A1 | 3/2009 | Mclean | |
| 2009/0115600 A1 | 5/2009 | Lee et al. | |
| 2009/0186603 A1 | 7/2009 | Usami et al. | |
| 2009/0193215 A1 | 7/2009 | Rogers | |
| 2009/0228511 A1 | 9/2009 | Atkin et al. | |
| 2009/0279507 A1 | 11/2009 | Kanazawa et al. | |
| 2010/0088192 A1 | 4/2010 | Bowles et al. | |
| 2010/0088305 A1 | 4/2010 | Fournier | |
| 2010/0161397 A1 | 6/2010 | Gauthier et al. | |
| 2010/0169231 A1* | 7/2010 | Bowles et al. | 705/306 |
| 2010/0228676 A1 | 9/2010 | Librizzi et al. | |
| 2011/0047621 A1 | 2/2011 | Brando et al. | |
| 2012/0079596 A1 | 3/2012 | Thomas et al. | |
| 2012/0116929 A1 | 5/2012 | Gventer et al. | |
| 2013/0198144 A1 | 3/2013 | Bowles | |
| 2015/0046343 A1 | 2/2015 | Martini | |
| 2015/0066677 A1 | 3/2015 | Bowles et al. | |

OTHER PUBLICATIONS

International Search Report and Written Opinion for PCT/US2011/058667; dated Apr. 17, 2012.

International Search Report and Written Opinion for PCT/US2011/058644; dated Feb. 21, 2012.

International Search Report and Written Opinion for PCT/US2011/058661; dated Apr. 25, 2012.

Brannon, C. (2006). Unique Reverse Logistics Challenges of IT Asset Disposition. Reverse Logistics Magazine.

Feick, D. (Jan. 2011 ). Cambridge company welcomes your 'e-waste'. Going Green: A special advertising feature.

Zulhuda, S., "The state of e-government security in Malaysia: reassessing the legal and regulatory framework on the threat of information theft" Intemaional Islamic Univ. of Malaysia, 2012.

Van Der Vorst, et al., "Innovations in Logistics and ICT in Food Supply Chain Networks", 2005.

Xiong, B. H., et al., "A practical web-based tracking and traceability information system for the pork products supply chain", New Zealand Journal of Agricultural Research, 2007, 50:5, 725-733.

SDB Staff, "New Jersey Comptroller Finds State Agencies Failed to Remove Confidential Information From Computers", Storage & Destruction Business, Mar. 24, 2011.

Coia, Anthony; "Thinking in reverse—Transportation series; electronics recycling", Recycling Today, Oct. 2003.

Hastings, H. and Sande, S., "White Paper: Considerations for developing an IT disposal policy", Dec. 2009.

ATC Logistics & Electronics, "Improving the Consumer Experience: Protecting brand integrity with advanced 3PL services", White Paper, www.atcle.com, (Jul. 23, 2010).

Cairns, C. N., "E-Waste and the Consumer: Improving Options to Reduce, Reuse and Recycle", IEEE, 2005, pp. 237-242.

ATC Logistics & Electronics, "Asset Recovery, Green Logistics: Sustainable 3PL Practices for reverse logistics and asset management", White Paper, www.atcle.com, Dec. 8, 2009.

The examiner defines "quarantine" as "A period of isolation or detention". See World English Dictionary, Collins English Dictionary, Complete Unabridged 10th Edition (2009).

www.n-gage.com (latest date of Feb 14, 2012), Get Apps for your Nokia device, retrieved on Feb. 7, 2013 from www.n-gage.com.

How to Remote Wipe an iPhone or iPad (Jun. 5, 2012).

The examiner defines "server" as "A computer or program that supplies data or resources to other machines on a network." (emphasis added). See definition at https://web.archive.org/web/20120321215316/http://www.collinsdictionary.com/dictionary/english/server, archived back to Mar. 21, 2012.

White, P., "Understanding and Using Parallelism in Sqp Server", Simple Talk (2011).

Legal Ombudsman, "Information retention and disposal policy" (Sep. 24, 2010).

APQC, "Reverse Logistics; Bakcwards Practices that Matter", GENCO Distribution System, Inc., Case Study, Jan. 12, 2007.

"Cell Phones Recycled Through County Program Are Safe From ID Theft", US Fed News Service, Including US State News, Dec. 15, 2006) Retrieved from http://search.proquest.com/docview/469551645?accountid=14753.

Aquino, G., "Dialed in: Cell phone recycling", PC WorldCom, (2004), 1. Retrieved from hffp:/Isearch .proquest.com/docview/200685558 ?accou ntid= 14 753.

"Secure solutions for erasing personal cell phone data; cell phone data eraser tool offers more than 480 cell phone user guides to erase personal information", (Aug. 31, 2006). PR Newswire Retrieved from http://search.proquest.com/docview/451123304?accountid=14753.

* cited by examiner

SYSTEM AND METHOD FOR FLASHING A WIRELESS DEVICE

CROSS-REFERENCE TO RELATED APPLICATIONS

The application is a co-pending application of U.S. patent application Nos. 12/940,331 and 12/940,346 entitled "SYSTEM AND METHOD FOR REMOVING CUSTOMER PERSONAL INFORMATION FROM AN ELECTRONIC DEVICE"and "SYSTEM AND METHOD FOR AUDITING REMOVAL OF CUSTOMER PERSONAL INFORMATION ON ELECTRONIC DEVICES"which are being filed concurrently herewith. The teachings and disclosures of which are each hereby incorporated in their entireties by reference thereto.

BACKGROUND

Usage of mobile, wireless, and electronic devices has grown nearly exponentially in recent years. The expanded use of such products and devices has been fostered by improvements in communications standards, protocols, signaling, hardware, software, and other advances. Under various circumstances, users may return electronic devices to an original equipment manufacturer (OEM), retailer, repair facility, service provider or other entity. Electronic devices are often returned for repairs, exchanges, warranty issues, or any number of other justified or arbitrary reasons. It is imperative that any electronic device that has been returned be cleared of all personal information, sensitive data, or other information linked to a previous user. If the personal information is not removed, applicable laws, industry standards, and common business practices may be violated. For example, the personal information may be used by another party to perpetrate an act of identity theft. Similarly, a previous user's privacy may be otherwise violated.

SUMMARY

One embodiment provides a system and method for flashing wireless devices. One or more wireless devices may be received. The testing device may be operable to receive the one or more wireless devices simultaneously. A selection of one or more original equipment manufactures (OEMs) may be received. Models of wireless devices associated with the one or more OEMS may be visually displayed for in response to receiving the selection of the one or more OEMS associated with the one or more wireless devices. A selection of one or more models associated with the one or more wireless devices may be received on the test device. Instructions associated with the one or more models may be displayed for flashing the one or more wireless devices. The one or more wireless devices may be flashed in response to a user selection to flash each of the one or more wireless devices.

Another embodiment provides a system for flashing wireless devices. The system may include a number of test clients. The system may also include a managing device for updating an application utilized by each of the number of test clients to remove personal information from one or more wireless devices. Each of the number of test clients may be operable to receive a number of wireless devices for simultaneous or concurrent flashing the number of wireless devices, receive a selection of an OEM associated with a wireless device included within the number of wireless devices connected to the test client, visually display models of each of a number of wireless devices associated with the OEM for receiving a user selection of a wireless device in response to receiving the selection of the OEM associated with the wireless device, receive a selection of a model associated with the wireless device, display instructions associated with the model for flashing the wireless device, and flash the wireless device in response to a user selection to flash the wireless device.

Yet another embodiment provides a test device for testing electronic devices. The test device may include a processor for executing a flashing application and a memory for storing the application. The memory may include a number of partitions for testing a number of electronic devices from a number of OEMs. The application may be operable to receive a selection of an OEM associated with a electronic device from the plurality of OEMs, visually display models of electronic devices associated with the OEM in response to receiving the selection of the OEM associated with the electronic device, receive a selection of a model associated with the electronic device; on the test device, display instructions associated with the model for flashing the electronic device, and concurrently flash the one or more of the plurality of electronic devices in response to a user selection to flash each of the plurality of electronic devices. The testing device may also include a number of adapters for connecting the number of electronic devices to the test device simultaneously. The testing device may further include a communications interface for communicating with one or more managing devices to update the application and information utilized by the application.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

The illustrative embodiments provide a system and method for detecting and removing customer private information (CPI) from electronic devices. CPI is removed from electronic devices in order to ensure the electronic devices may be repaired, exchanged, refurbished, returned, substituted, or otherwise recycled for usage. The detection of and removal of CPI allows service providers and other organizations or parties to comply with applicable laws, meeting industry standards, and maintain good relationships with consumers, retailers, service providers, and others that may utilize the electronic device or provider services for those electronic devices.

The illustrative embodiments may be implemented as a local client, networked system, or device for flashing electronic devices. Flashing electronic devices includes removing all personal information previously entered or utilized by a previous owner or user as well as ensuring the electronic device has the most updated versions of software, firmware, or other required or designated applications for utilizing the electronic device. The illustrative embodiments may allow multiple electronic devices, such as cell phones to be connected to a single flashing device (also referred to as a testing device or client) for flashing multiple electronic devices.

Electronic devices may include computing and telecommunications devices including cell phones, PDAs, smart phones, laptops, e-readers, mp3 players, and other forms of person or consumer electronic devices. CPI may include information, such as phone numbers, addresses, email addresses, IP addresses, social security numbers, bank accounts, contact lists, address books, passwords, usernames, and other sensitive information associated with the user or utilized by the user. Due to the prolific usage of wireless device, the process of flashing a wireless device is utilized as an ongoing example even though the process may be utilized for any number of electronic devices.

The process of flashing one or more electronic devices may take anywhere from a matter of seconds to a number of minutes. As a result, the technician or operator, herein referred to as a user, may initiate flashing for each of the electronic devices individually, as a group, or for an entire group which may represent electronic devices from multiple original equipment manufacturers (OEMs) or multiple devices of a single or different OEM's electronic device(s) at different times, concurrently or simultaneously, based on the preferences of the user.

The inability to properly remove CPI may result in identity theft, consumer bad will, contract or legal violations, and other undesirable effects or outcomes. In various embodiments, the CPI removal and detection process may be utilized or integrated into warehouse management operations, logistics services, and systems and devices that are utilized to process electronic devices. The electronic devices are processed by determining or detecting whether CPI is present on the electronic device, removing the CPI if necessary and reporting the removal or non-removal of CPI on devices that are being processed or have previously been processed to provide an audit trail as well as trend analysis information to interested parties. The embodiments as herein described may be automated or may require user interaction. In particular, the illustrative embodiments provide a system and method for tracking CPI that is detected on processed or unprocessed electronic devices and implementing CPI removal as well as tracking. The illustrative embodiments may be utilized to check for or check and clear CPI from electronic devices (also referred to as detect or detect and delete).

Figure 1:
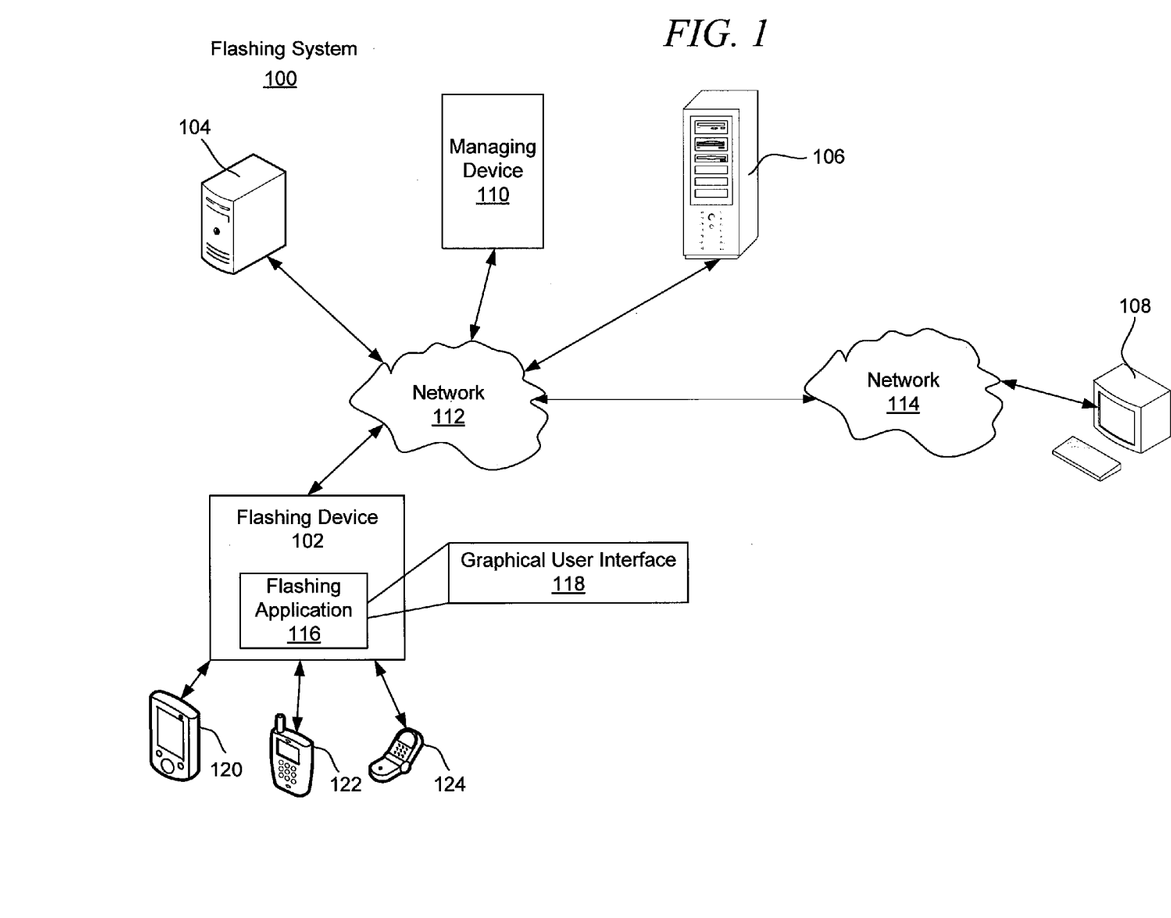
FIG. 1 is a pictorial representation of a flashing system in accordance with an illustrative embodiment.

In one embodiment, the flashing device may include multiple partitions for implementing flashing for the electronic devices. A flashing application may be implemented or executed by the flashing device to flash the electronic devices by removing customer personal information (CPI) and updating the electronic device to include the most recent update or returning the electronic device back to a factory standard configuration. Updates or configurations of the electronic device are defined to include operating systems, firmware, applications and other software required to operate the electronic device, FIG. 1 is a pictorial representation of a flashing system in accordance with an illustrative embodiment. FIG. 1 provides an embodiment of a flashing system 100. The flashing system is an electronic environment or networked system for individual devices that individually or together may be utilized to perform flashing for a number of wireless devices.

In one embodiment the flashing system 100 may include flashing devices 102, 104, 106 and 108, a managing device 110 and networks 112 and 114. The flashing device 102 may further include the flashing application 116 displaying a graphical user interface 118 and may be utilized to test wireless devices 120, 122 and 124. As shown, the networks 112 and 114 represent public or private data or communication networks.

In one embodiment, network 112 may represent a private network utilized by a service provider to test numerous wireless devices returned to the service provider for repair, refurbishment, replacement, or for other circumstances. For example, the network 114 may represent an open or public network, such as the internet that is accessed by millions of users daily. The networks 112 and 114 may represent any number of private, virtual, or public networks.

The flashing devices 102, 104, 106 and 108 (102-108) represent communication devices each of which may be utilized to flash a number of wireless devices. Each of the flashing devices 102-108 may execute a version of the flashing application 116 in order to flash wireless devices, such as wireless devices 120, 122 and 124. Alternatively, the flashing devices 102-108 may access a flashing application stored and executed by the managing device 110 through the network 112. The managing device 110 is a computing device configured to manage the flashing systems, operations, applications and updates utilized by the flashing devices 102-108. In one embodiment, the managing device 110 may itself be a flashing device.

In one embodiment, the managing device 110 communicates with a network web portal during the initialization phase of the flashing system 100 or at a designated timeframe during off service hours to update the flashing application 116 or data including all applicable new software packages, utilized by the flashing applications 116 to flash the wireless devices 120, 122 and 124. The managing device 110 may control the flow of network information pertaining to updates so as to prevent the user from applying a flash request to an OEM or device which is in the process of updating. For example, during updates a visual blinking red light may indicate "Updates are in Progress . . . . Please wait" with the OEM selection process being locked out until update are completed and a status indicator light goes green to indicate the flashing device 102 is "ready."

The managing device 110 may also receive or archive information and data regarding the flashing of wireless devices, such as wireless devices 120-124 performed by each of the flashing devices 102-108. As a result, the flashing activities of the service provider may be monitored, tracked, or archived for subsequent reference.

In one embodiment, the flashing system 100 may be utilized in a single building or complex of the service provider for flashing wireless devices. The flashing device 108 may represent a device at a remote facility, such as an annex building or retail store, that is also utilized for flashing wireless devices. The flashing application 116, as well as the graphical user interface 118, may allow a user to flash the wireless devices 120, 122 and 124. The flashing application 116 may also be executed by a standard computing or communications device to perform flashing by utilizing a number of adapters or hubs for connection to multiple wireless devices.

In one embodiment, the flashing application 116 may be executed on separate partitions of the flashing device 102 simultaneously in order to concurrently or simultaneously test the wireless devices 120, 122 and 124. The processes used by the flashing application 116 may not be compatible (inducing conflicts or errors) for all OEMs or wireless devices models requiring that separate instances of the flashing application 116 be executed so that user time and effort to flash the wireless devices 120-124, as well as computing resources are minimized.

In one embodiment, the partitioning is necessary to implement instances of the flashing application 116 (or separate flashing applications customized for specific OEMs or models) on separate partitions that would otherwise experience memory conflicts or errors if the flashing applications were running on the same partition. For example, wireless devices 120 and 124 might not be able to be tested concurrently because of conflicts within the flashing application 116. As a result, separate instances of the flashing application 116 may be executed on a first partition for flashing the wireless devices 120 and 122 that do not have conflicts and a separate instance of the flashing application 116 may be executed on a second partition for flashing the wireless device 124. As a result, the wireless devices 120-124 may be flashed concurrently or simultaneously despite potential conflicts or errors.

Figure 2:
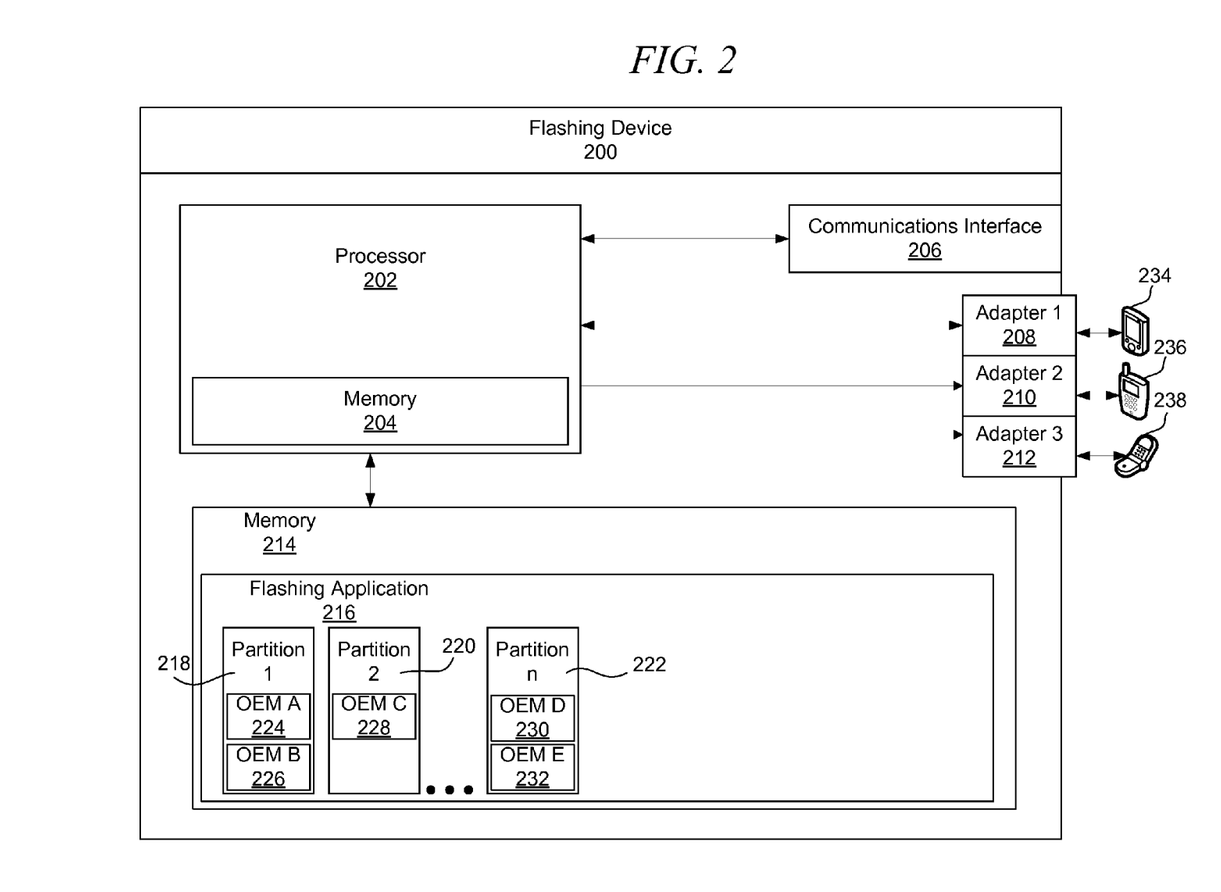
FIG. 2 is a block diagram of a flashing device in accordance with an illustrative embodiment.

FIG. 2 is a block diagram of a flashing device in accordance with an illustrative embodiment. FIG. 2 illustrates an embodiment of a flashing device 200. The flashing device 200 may be a particular implementation of the flashing devices 102-108 or the managing device 110 of FIG. 1. The flashing device 200 may include any number of computing and communications element including hardware, software, and peripherals that are not specifically shown, such as circuits, motherboards, adapters, displays, circuits, logic, and other similar elements.

In one embodiment, the flashing device 200 may include a processor 202, a memory 204, a communications interface 206, adapter 1 208, adapter 2 210, adapter 3 212, a memory 214, an application 216, partition 1 218, partition 2 220 and partition n 222. The respective partitions 218-222 may include OEM A 224, OEM B 226, OEM C 228, OEM D 230 and OEM E 232. The communications interface 206 is an interface for communicating with one or more networks or devices.

The processor 202 is circuitry or logic enabled to control execution of a set of instructions. The processor 202 may be microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor 202 may be a single chip or integrated with other computing or communications elements.

The memories 204 and 214 are hardware elements, devices, or recording medias configured to store data for subsequent retrieval or access at a later time. The memory 204 may be static or dynamic memory. The memory 204 may include a hard disk, random access memory, cache, removable media drive, mass storage, or configuration suitable as storage for data, instructions, and information. In one embodiment, the memory 204 and processor 202 may be integrated. The memory may use any type of volatile or non-volatile storage techniques and mediums.

In one embodiment, the communications interface 206 is an Ethernet network interface for communicating through an Ethernet network. The communications interface 206 may also represent other forms of network adapters for communicating with or through traditional or proprietary networks.

The adapters 208-212 represent adapters for communicating with a number of different wireless device types. For example, the adapters 208-212 may include mini or micro USB adapters or other similar adapters for communicating with wireless devices 234, 236 and 238. The adapters 208-212 are representative of interfaces that may communicate with wireless devices of all makes and models. Adapters 208-212 are shown as illustrative embodiments only. In one embodiment, the flashing device 200 includes enough adapters to fully occupy the time of the user in connecting and testing a number of wireless devices concurrently. For example, a user may connect the wireless devices 234 and 236 to adapter 1 208, and adapter 2 210, respectively, in order to initiate and complete the flashing process.

Once the flashing process has been initiated, the user may connect the wireless device 238 to the adapter 212 to begin testing for the wireless device 238. The flashing device 200 may also be connected to a number of other wireless devices thereby efficiently employing the user's time as well as the resources of the flashing device 200. The memory 214 may be configured to store data and information utilized by the flashing application 216 to perform the flashing as well as the result from the flashing and the flashing application 216 itself. The flashing application 216 may be configured to automatically flash the wireless devices 234-238 or to implement the flashing based on user input.

In one embodiment, once the wireless devices 234-238 are connected to the respective adapters 208-212, the application 216 may recognize the wireless devices 234-238 and implement the designated flashing process which may include removal of all CPI and reinstalling the updates corresponding to the wireless device.

In another embodiment, the application 216 may allow a user to specify an OEM model and other details associated with each of the wireless devices 234-238 so that the application 216 may guide the user through a complete flashing of the wireless devices 234-238. As a result, the partitions including partition 1 218, partition 2 220, and partition n 222 may execute separate instances of the application 216 to test the wireless devices 234-238. For example, partition 1 may execute an application for OEM A 224 and OEM B 226 because of their flashing compatibilities.

The application 216 may be separately implemented on partition 2 220 for OEM C 228 based on a conflict OEM C 228 (or associated devices) may have with OEM B 226 and OEM D 230 (and their associated devices). Similarly, partition n 222 may execute an application for OEM D 230 and OEM E 232 to test specific wireless devices. Although not specifically shown herein, the flashing device 200 includes any number of partitions that allows for testing numerous wireless devices representing different OEMs and models. Partition 1 218, partition 2 220, and partition n 222, may represent partitions of the memory 214 that are divided into logical drives associated with data and application storage.

In one embodiment, the memory 214 may include a primary partition and may be further divided into other secondary logical drives and partitions that may be assigned names, letters, and identifiers for storing and accessing the related flashing applications.

Figure 3:
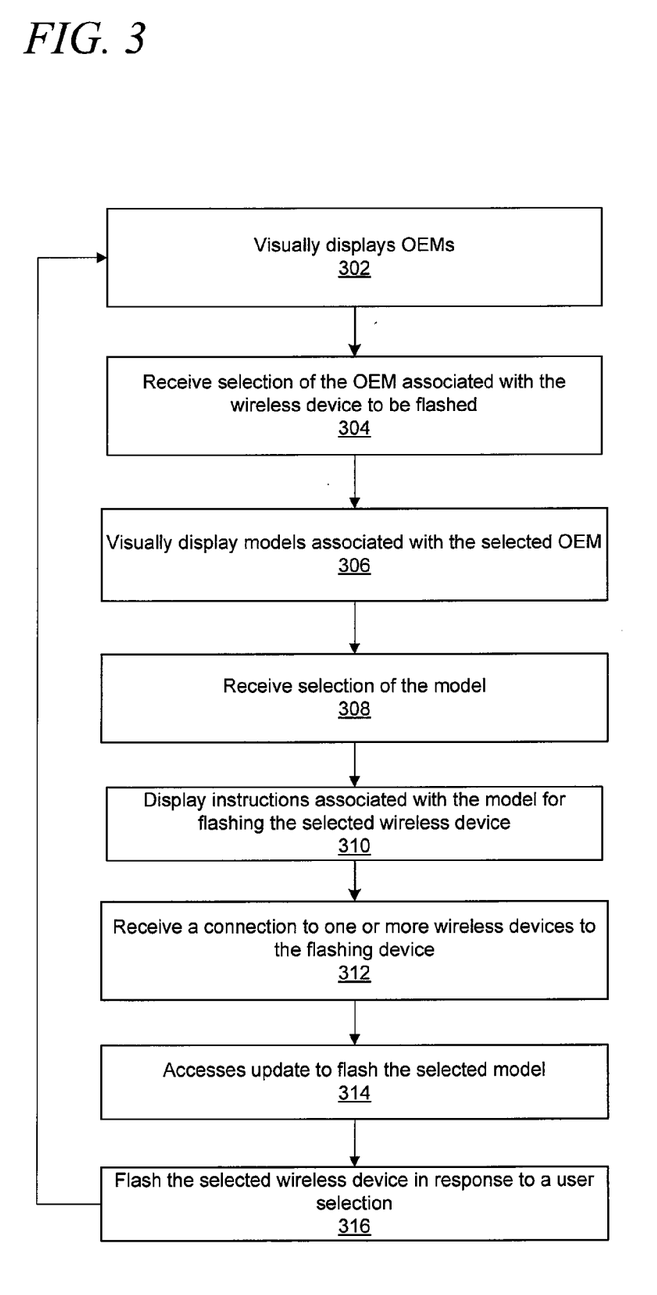
FIG. 3 is a flowchart of a process for flashing an electronic device in accordance with an illustrative embodiment.

FIG. 3 is a flowchart of a process for flashing an electronic device in accordance with an illustrative embodiment. The process of FIG. 3 may be implemented by one or more flashing devices in accordance with an illustrative embodiment. The process of FIG. 3 may be implemented simultaneously or concurrently for numerous different wireless devices. For example, the process may be initiated for a first wireless device and then once the flashing process begins which may take five minutes the user may turn his or her attention to another wireless device and utilize the flashing device to begin flashing a second wireless device. Alternatively, the process may be initiated manually or simultaneously for multiple wireless devices.

The process of FIG. 3 begins by the flashing system user interface visually displaying OEMs (step 302). The OEMs of step 302 may be OEMs with which a particular service provider, company, or group works with. For example, the flashing device may display the OEMs available based on previous selections. For example, the OEM most frequently associated with wireless devices being flashed may be displayed first with other OEMs similarly being displayed based on previous selections. Alternatively, the OEMs may be displayed utilizing alphabetical order or other formats selected by a user.

Next, the flashing device receives selections of the OEM associated with the wireless device to be flashed (step 304). The selections or user input provider during the process of FIG. 3 may be received through a touch screen, mouse selection, voice input or through any number of other communications signals or interactions with the flashing device as are known in the art.

Next, the flashing device visually displays models associated with the selected OEM (step 306). The information displayed during the process of FIG. 3 may be displayed utilizing libraries, databases, files, links or other elements for properly linking to the correct information and displaying to the user.

The flashing device receives selection of the model (step 308). Next, the flashing device displays instructions associated with the model for flashing the selected wireless device (step 310). In some cases, the steps required to remove all personal information, completely clear the memory, or perform updates for the wireless device may be complicated or may differ across OEMs or models. As a result, the instructions are particularly useful for the user in order to efficiently step through the process for flashing the wireless device for a number of devices. The instructions may be displayed textually and audibly for facilitating the user's progression to flashing the wireless device.

Next, the flashing device receives a connection to one or more wireless devices to the flashing device (step 312). In one embodiment, the user may connect an adapter such as a micro USB adapter to the micro USB port of the wireless device. The wireless device may also require that it be powered on or placed in a configuration mode in order to communicate with the flashing device. The flashing device may provide an index, help, or instructions for guiding the users.

Next, the flashing device accesses updates to flash the selected model (step 314). The updates may include applications, operating systems, versions, firmware and other elements for ensuring the wireless device has the most up-to-date operating software and instructions provided by the OEM service provider or other group with which the wireless device is associated. In one embodiment, the updates may have previously been downloaded to the flashing device and associated with the application. In another embodiment, the updates may be downloaded from a network resource or alternative or secondary resource in order to further proceed with flashing of the wireless device.

Next, the flashing device flashes the selected wireless device in response to a user selection (step 316). In one embodiment, all memory locations of the wireless device associated with CPI may be cleared and any applicable fields, text or memory may be deleted, written over or otherwise cleared. Similarly, the wireless device may have the operating system, most recent applications, or other updates installed or reinstalled on the wireless device. In some cases, reinstallation of the operating system and other updates may supersede clearing of CPI information as the CPI information is automatically deleted or written over during the reinstallation process.

The process of FIG. 3 may then be implemented for another wireless device beginning with visually displaying OEMs (step 302) to receive the applicable selection. Alternatively, for identical wireless device the flashing device may receive a connection of one or more wireless devices to the flash device (step 312) based on an operator action with the process proceeding as described herein.

Figure 4:
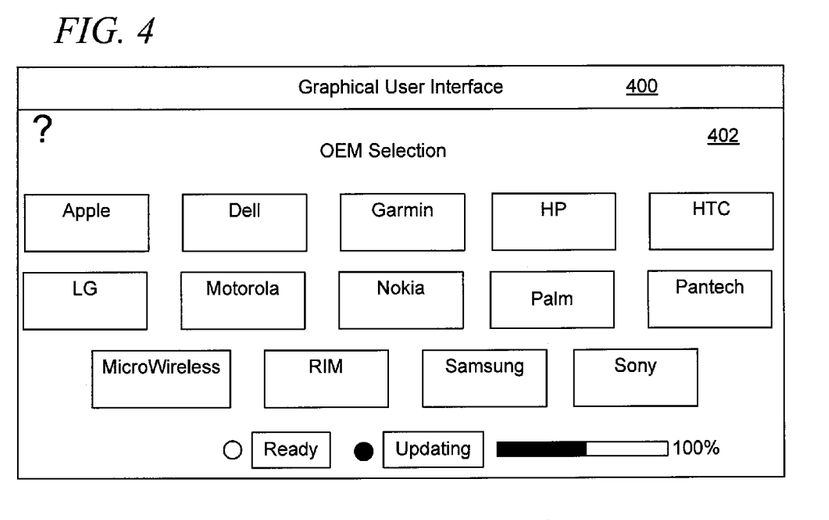
FIG. 4 is a pictorial representation of a graphical user interface for selecting an OEM in accordance with an illustrative embodiment.

FIG. 4 is a pictorial representation of a graphical user interface for selecting an OEM in accordance with an illustrative embodiment. The graphical user interface 400 displays a window or user interface for an OEM selection 402. The OEM selection 402 may allow a user to select any number of OEMs associated with the wireless device to be tested. Examples of OEMs may include Apple, Del, Garmin, HP, HTC, LG, Motorola, Ericcson, Nokia, Palm, Pantech, Micro Wireless, RIM, Samsung and Sony.

In one embodiment, new OEMS may be added based on manual inputs or based on a search for other OEMs that are not displayed in the OEM selection 402. Interactions with the graphical user interface 400 may be implemented through a mouse, keyboard, touch screen, the wireless device itself, verbal commands or other forms of communication or signal with the flashing device. The OEM selection 402 may indicate whether the OEM information is ready or is being updated and the progress of any ongoing updates. Any of the graphical user interfaces of FIGS. 4-7 may display a help icon for providing the user additional information about the OEM, model, or flashing process at any time.

Figure 5:
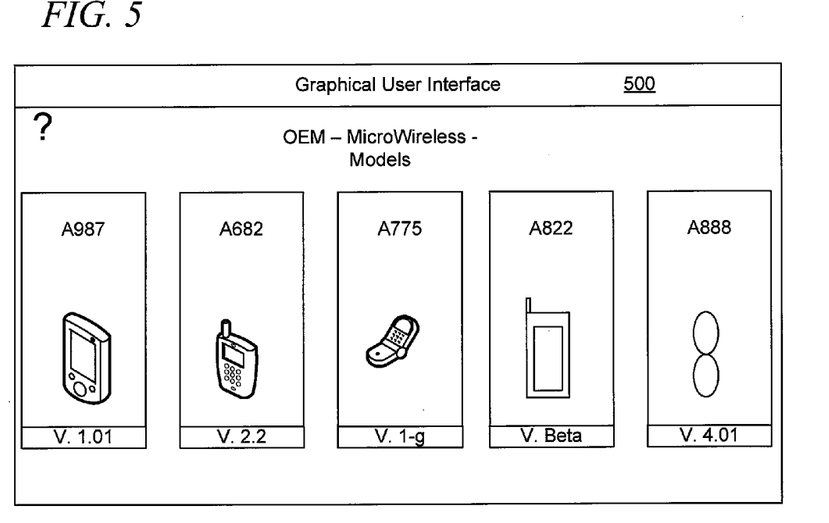
FIG. 5 is a pictorial representation of a graphical user interface for selecting a particular electronic device model in accordance with an illustrative embodiment.

FIG. 5 is a pictorial representation of a graphical user interface for selecting a particular electronic device model in accordance with an illustrative embodiment. The graphical user interface 500 may display a number of models associated with the selected OEM. For example, the graphical user interface 500 may display all of the applicable models associated with the OEM Micro Wireless. The models may include a number designator, identification, picture, search window, or other information utilized to select the applicable model.

Figure 6:
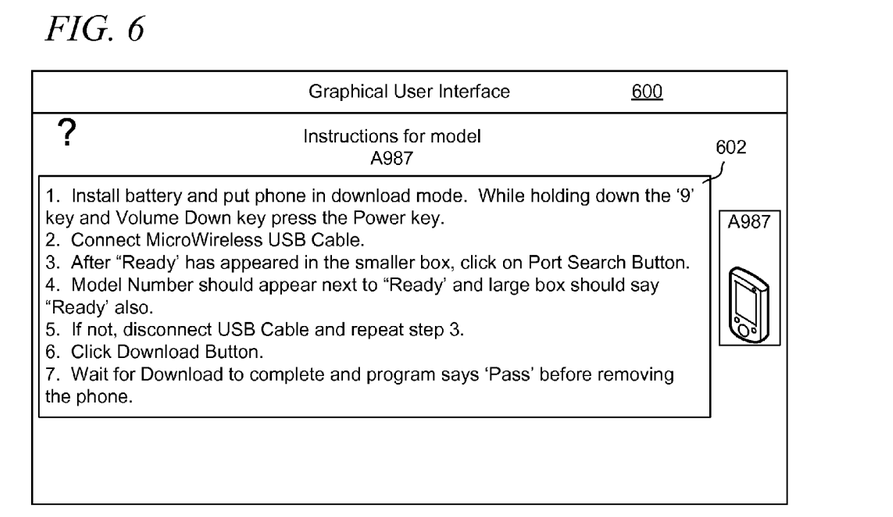
FIG. 6 is a pictorial representation of a graphical user interface for providing instructions to a user flashing an electronic device in accordance with an illustrative embodiment.

FIG. 6 is a pictorial representation of a graphical user interface for providing instructions to a user flashing an electronic device in accordance with an illustrative embodiment. The graphical user interface 600 provides an interface for displaying instructions for the selected model. For example, if the user has selected Micro Wireless as the OEM and the A987 model the graphical user interface may display instructions 602. The instructions may provide details for ensuring that the wireless device is properly flashed.

In one embodiment, the graphical user interface 600 may include a button 604 or selection element for posting questions, requesting instruction clarifications, or otherwise providing dynamic feedback for improving the flashing application. For example, the user may add suggestions, remove redundant steps or otherwise configure the instructions 602 for preciseness or to be more efficient. In one embodiment, the editing features or adding features of FIGS. 4-7 may only be available to an administrator or other user authorized to reconfigure the graphical user interface 600 of the flashing application in a programming or update mode.

Figure 7:
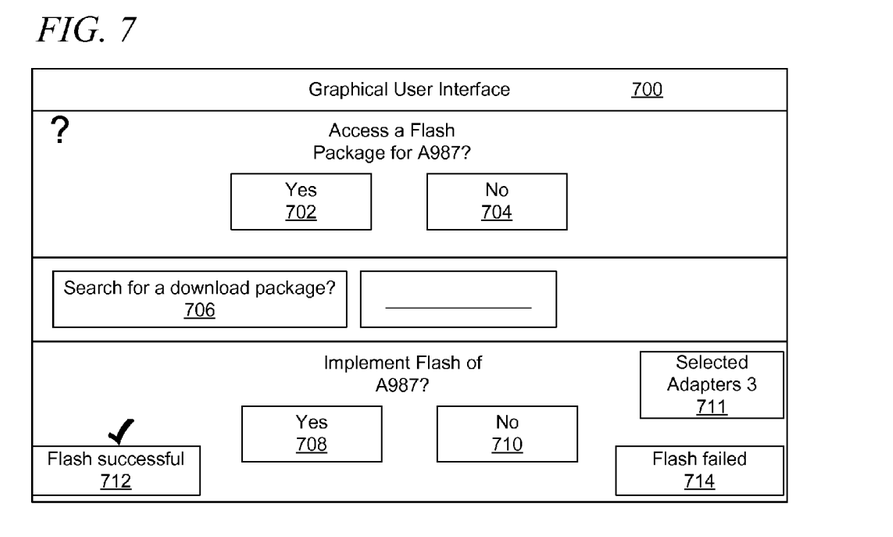
FIG. 7 is a pictorial representation of a graphical user interface for implementing flashing of an electronic device in accordance with an illustrative embodiment.

FIG. 7 is a pictorial representation of a graphical user interface for implementing flashing of an electronic device in accordance with an illustrative embodiment. The graphical user interface 700 may include selection elements 702 and 704 for selecting whether to access a flash package for the selected model. For example, selection of the selection element 702 may begin a script program or instructions that communicate updates to the wireless device. Selection of the selection element 702 may also retrieve the applicable information utilized to flash the selected wireless device. If the appropriate flash package including updates, instructions or other information is unavailable, a selection element 706 may be displayed to the user for searching for a download package.

Once the user has all of the necessary information the user may be displayed selection elements 708 and 710 for selecting whether to implement a flash for the selected wireless device. At any time during the display of the graphical user interface 700, the user may be allowed to select one or more adapters for which the process is implemented. For example, the user may utilize selection element 711 to select one or more adapters associated with the selected wireless device. As a result, the flashing process is performed for the specified adapters.

In another embodiment, the user may have connected a number of identical models to the flashing device to be flashed. As a result, the process may be implemented simultaneously or concurrently (representing different initiation times) for each of those identical models as selected by the user utilizing a selection element such as selection element 711 that allows the user to specify the wireless devices and the adapters associated with each of those devices.

Indicators 712 and 714 may indicate whether the flash was successful or whether it failed. Other indicators may also allow the user to specify whether to archive or save tests associated with the flashing process. For example, the service provider may want to document a memory map of the wireless device showing that it has been properly flashed and that no CPI is available on the wireless device as shown by memory mapping, tests, or other data that verify the flashing process has occurred and has occurred correctly.

The previous detailed description is of a small number of embodiments for implementing the invention and is not intended to be limiting in scope. The following claims set forth a number of the embodiments of the invention disclosed with greater particularity.

What is claimed:

1. A method for flashing wireless devices, the method comprising:
    establishing communication between a testing device and one or more wireless devices;
    receiving a selection of one or more original equipment manufacturers (OEMs);
    visually displaying models of wireless devices associated with the one or more OEMS in response to receiving the selection of the one or more OEMS associated with the one or more wireless devices;
    receiving a selection of one or more models associated with the one or more wireless devices on the test device; and
    flashing the one or more wireless devices concurrently to at least remove customer personal information in response to a user selection to flash each of the one or more wireless devices, wherein flashing is performed using a separate flashing application, executed on separate partitions of the testing device, for each of the one or more wireless devices, wherein the separate flashing application is customized specifically for the one or more models associated with the one or more wireless devices.

2. The method according to claim 1, wherein flashing the one or more wireless devices further comprises:
    downloading updates on the testing device; and
    installing the updates on the wireless device.

3. The method according to claim 2, wherein the updates include updated firmware and/or updated software versions available from the OEM.

4. The method according to claim 2, further comprising:
    testing the one or more wireless devices to ensure the one or more wireless devices includes the updates.

5. The method according to claim 2, further comprising:
    comparing a memory map of the one or more wireless devices against a baseline memory map associated with a configuration of each of the one or more wireless devices to ensure the updates are installed on each of the one or more wireless devices.

6. The method according to claim 1, further comprising:
    recording an identification of the one or more wireless devices indicating the flashing has been performed.

7. The method according to claim 6, wherein the recording further comprises:
    saving information read from the one or more wireless devices indicating all content stored on the one or more wireless devices after performing the flashing.

8. The method according to claim 6, wherein verifying further comprises:
    determining an International Mobile Equipment Identity (IMEI) associated with each of the one or more wireless devices as the identification.

9. The method according to claim 1, wherein the testing device includes a plurality of adapters for connecting to each of the one or more wireless devices, and wherein the one or more wireless devices are enabled to be tested singly, concurrently, and simultaneously.

10. The method according to claim 1, further comprising:
    updating information on the testing device at a reoccurring time.

11. The method according to claim 1, wherein the selections are received through a graphical user interface displayed by the test device.

12. The method according to claim 1, further comprising displaying step-by-step user instructions associated with the one or more models for flashing the one or more wireless devices on a single screen image.

13. A system for flashing wireless devices, the system comprising:
    a plurality of test clients; and
    a managing device for updating an application utilized by each of the plurality of test clients to remove personal information from one or more wireless devices, each of the plurality of test clients being operable to:

receive a plurality of wireless devices for flashing of the plurality of wireless devices, receive a selection of an original equipment manufacturer (OEM) associated with a wireless device included within the plurality of wireless devices connected to one of the plurality test clients, visually display models associated with the OEM in response to receiving the selection of the OEM associated with the wireless device, receive a selection of a model associated with the wireless device, and flash the wireless device to at least remove customer personal information in response to a user selection to flash the wireless device, wherein flashing is performed using a separate flashing application for each model associated with the one or more wireless devices, wherein the separate flashing application is customized specifically for the one or more models associated with the one or more wireless devices.

14. The system according to claim 13, wherein each of the plurality of test clients includes a plurality of partitions for running the application separately on the plurality of partitions for testing wireless devices from different OEMs that are incompatible, and wherein the plurality of wireless devices are enabled to be tested singly, concurrently, and simultaneously.

15. The system according to claim 14, wherein compatible OEMs are grouped in one or more of the plurality of partitions.

16. The system according to claim 13, wherein each of the plurality of test clients is operable to flash a plurality of wireless devices utilizing adapters configured for testing the OEM and model.

17. The system according to claim 13, wherein each of the plurality of test clients is operable to download updates from the managing device for a plurality of OEMs and a plurality of models associated with each of the plurality of OEMs, the one of the plurality of test clients installs the updates on the wireless device while flashing the wireless device.

18. A test device for testing electronic devices comprising:
a processor for executing a flashing application; and
a memory for storing the application, the memory includes a plurality of partitions for testing a plurality of electronic devices from a plurality of original equipment manufacturers (OEMs), wherein the flashing application is operable to:
receive a selection of an OEM associated with an electronic device from the plurality of OEMs;
visually display models of electronic devices associated with the OEM in response to receiving the selection of the OEM associated with the electronic device;
receive a selection of a model associated with the electronic device;
display step-by-step user instructions associated with the model for flashing the electronic device; and
concurrently flash the one or more of the plurality of electronic devices to at least remove customer personal information in response to a user selection to flash each of the plurality of electronic devices, wherein flashing is performed using a separate instance of the flashing application for each of the plurality of electronic devices;
a plurality of adapters for connecting the plurality of electronic devices to the test device simultaneously; and
a communications interface for communicating with one or more managing devices to update the application and information utilized by the application.

19. The test device according to claim 18, wherein compatible OEMs are grouped in one or more of the plurality of partitions.

20. The test device according to claim 18, wherein the plurality of partitions run the flashing application separately on the plurality of partitions for testing OEMs that are incompatible.

21. The test device according to claim 18, wherein the test device is operable to download updates from the one or more managing devices, and wherein the application is operable to install the updates on the electronic device.

22. The test device according to claim 21, wherein the updates include updated firmware and/or updated software versions available from the OEM.

* * * * *